United States Patent [19]

Suemoto et al.

[11] Patent Number: 5,099,313
[45] Date of Patent: Mar. 24, 1992

[54] WHITE BALANCE CONTROLLING DEVICE HAVING A DEVICE FOR DETERMINING WHETHER FLUORESCENT LIGHT IS BEING ILLUMINATED ON A SCENE

[75] Inventors: Kazunori Suemoto; Makoto Tsugita, both of Tokyo, Japan

[73] Assignee: Fuji Photo Film Co., Ltd., Kanagawa, Japan

[21] Appl. No.: 342,967

[22] Filed: Apr. 25, 1989

[30] Foreign Application Priority Data

Mar. 6, 1988 [JP] Japan .................................. 1-53364
Apr. 25, 1988 [JP] Japan ................................ 63-102260

[51] Int. Cl.$^5$ ............................................. H04N 9/535
[52] U.S. Cl. ..................................................... 358/29
[58] Field of Search ................................. 358/29, 29 C

[56] References Cited

U.S. PATENT DOCUMENTS 4,584,598 4/1986 Kutargi .................................. 358/29

FOREIGN PATENT DOCUMENTS 0127376 8/1982 Japan ................................. 358/29 C

OTHER PUBLICATIONS

Jay, Frank "IEEE Standard Dictionary of Electrical and Electronics Terms" 1984, p. 1003.

*Primary Examiner*—James J. Groody
*Assistant Examiner*—David E. Harvey

[57] ABSTRACT

A white balance control device used in an electronic image forming device having a color image sensor for providing color image signals includes a color balance correcting circuit that is provided to detect a color temperature of the light based on an output from a visible light sensor and to provide a correction signal according to the determined color temperature. Thereby the image signals may be corrected in white balance. The color balance correcting circuit may be operated in a fluorescent light mode or a natural light mode. A light source determining circuit cooperates with the color balance correcting circuit to determine whether the light source is a fluorescent light source in response to an output from an infrared light sensor and an actuating signal is provided that causes the white balance correcting circuit to operate in the fluorescent light mode when the light source is a fluorescent light source.

13 Claims, 6 Drawing Sheets

WAVELENGTH

WHITE BALANCE CONTROLLING DEVICE HAVING A DEVICE FOR DETERMINING WHETHER FLUORESCENT LIGHT IS BEING ILLUMINATED ON A SCENE

BACKGROUND OF THE INVENTION

The present invention relates to a white balance controlling device for determining whether a fluorescent light source illuminates a subject.

Numeral electronic cameras, such as electronic still cameras or video cameras, are generally equipped with automatic white balance controllers. Such an automatic white balance controller detects a color temperature of a light source illuminates a subject to be recorded and corrects image signals of three primary colors which are provided from image sensors, such as charge coupled devices (CCDs), according to the color temperature detected thereby.

If a fluorescent lamp is used to illuminate a subject, the brightness of the subject tends to be relatively low and the fluorescent lamp generally generates flickered light. As a result, the operation of the white balance controller is difficult. To avoid effects of flickered fluorescent light, a shutter should be controlled to operate at a speed slower than 1/60 sec. Therefore, it is necessary to determine whether a light source is illuminating a subject. One such light source determining device has been disclosed in Japanese Unexamined Patent Publication No. 61-240,790. The light source determining device disclosed in the Japanese Unexamined Patent Publication No. 61-240,790 detects fluorescent light that flickers according to the commercial frequency of 50 or 60 Hz. The light source determining device is, therefore, not available for fluorescent light sources that generate light flickering at commercial frequencies, which vary from country to country, other than 50 or 60 Hz or at a frequency of several hundred Hz. A white balance controller in cooperation with the light source determining device thus constructed is not effective for such non-commercial fluorescent light sources.

OBJECT OF THE INVENTION

It is, therefore, an object of the present invention to provide an automatic white balance controller, which cooperates with a light source determining device, for determining whether a light source illuminates a scence independent from frequencies at which the light flickers.

SUMMARY OF THE INVENTION

The above and other objects of the present invention are made by utilizing the fact that fluorescent light contains a considerably small amount of light components having wavelengths longer than approximately 620 nm. Whether the light source is a fluorescent light source or not is determined by comparing visible light and infrared light having wavelengths longer than approximately 620 nm from a scene illuminated by the light source.

A white balance control device used in an electronic image forming device with a color image sensor in accordance with the present invention comprises a visible light sensor for detecting visible light having different wavelengths from a scene illuminated by a light source, an infrared light sensor for detecting infrared light having wavelengths longer than approximately 620 nm from the scene, and color balance correcting means operable in a fluorescent light mode or a natural light mode for determining color temperature of the light illuminating the subject based on outputs from the visible light sensor to provide a correction signal according to the determined color temperature which is used to correct image signals from the color image sensor in white balance. The color balance correcting means operates in the fluorescent mode in response to an actuating signal from light source determining means. The light source determining means determines whether the light source is a fluorescent light source based on an output from the infrared light sensor and provides the actuating signal when the light source is a fluorescent light source.

For a subject having a low subject brightness, it is preferred that the light source determining means determines whether the light source is a fluorescent light source by comparing an output from the infrared light sensor with an output from the visible light sensor.

If the output from the infrared light sensor is higher than a predetermined level, the light source determining means determines that the light source is not a fluorescent light source. In this case, the white balance control performs a white balance control based on the output from the visible light sensor.

On the other hand, if the output from the infrared light sensor is lower than a predetermined level, the light source determining means determines that the light source is a fluorescent light source. In this case, the white balance control means is changed to a fluorescent mode. However, if brightness of the subject is too low, the white balance control means is prevented from being changed to the fluorescent mode even when the subject is illuminated by a fluorescent light source.

The present invention will become more fully understood from the detailed description given hereinbelow and the accompanying drawings which are given by way of illustration only, and thus, are not limitative of the present invention, and wherein:

DETAILED DESCRIPTION OF THE PREFERRED EMBODIMENTS OF THE PRESENT INVENTION

Figure 1:
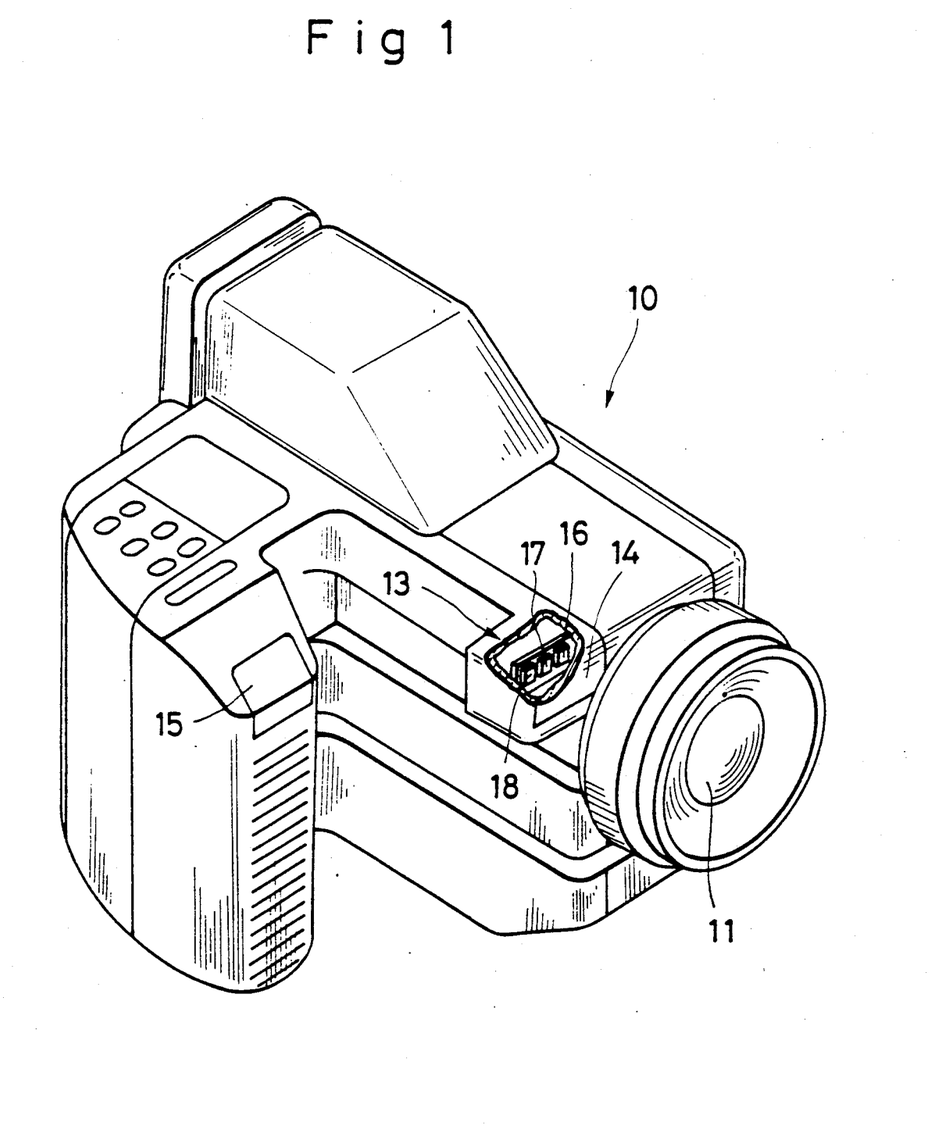
FIG. 1 is a perspective view, partly broken, illustrating an electronic still camera for an embodiment of the present invention.
Figure 2:
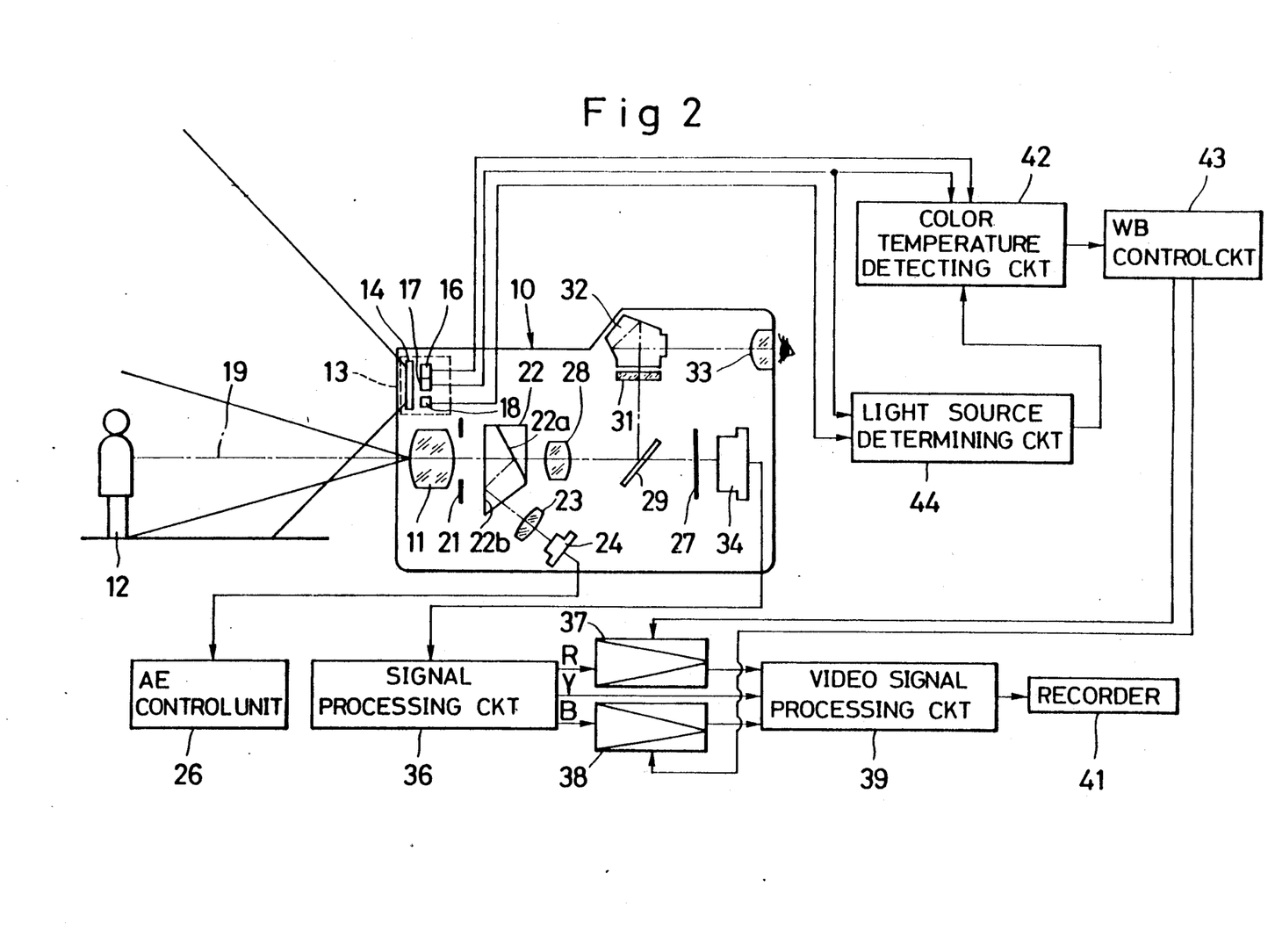
FIG. 2 is a block diagram further illustrating details of the electronic still camera in FIG. 1.

Referring now to FIGS. 1 and 2 which illustrate an electronic camera for an embodiment of the present invention, the camera 10 has a vari-focal or zoom lens 11 as a taking lens associated with a manual focusing mechanism, which is well known in the art, for focusing on a major subject 12. The camera 10 has a built-in automatic white balance controller including a light sensor unit 13 disposed above the taking lens 11. The light sensor unit 13 includes a diffusion plate 14, blue and red visible light sensors 16 and 17, and an infrared light sensor 18 disposed behind the diffusion plate 14.

Figure 3:
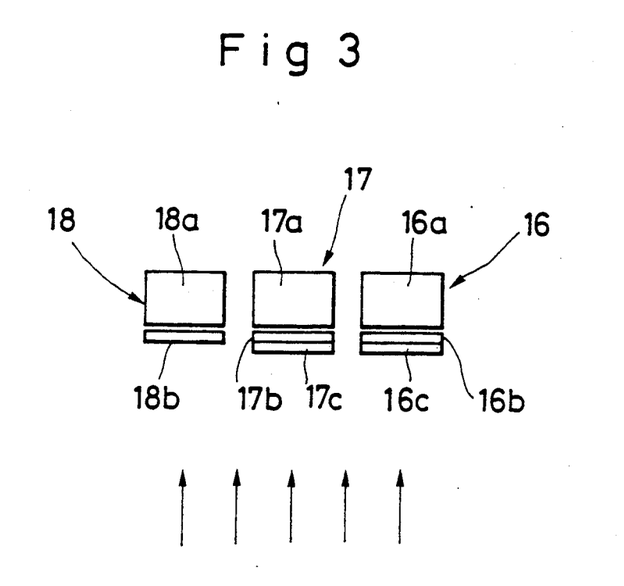
FIG. 3 illustrates a sensor unit used in the block diagram of FIG. 1.
Figure 4:
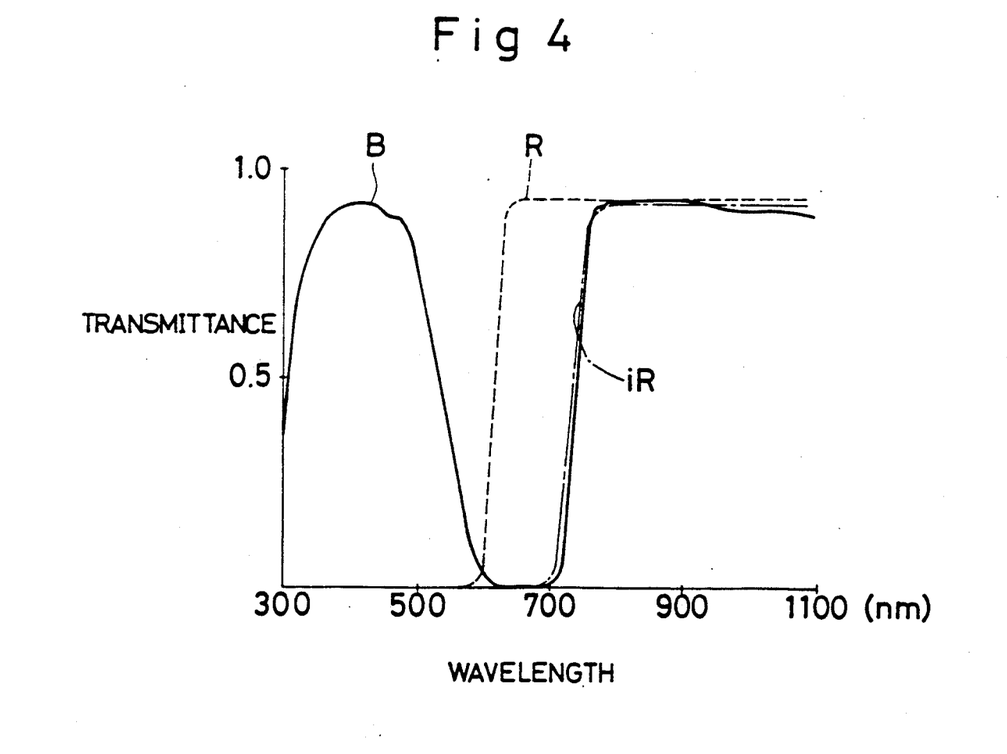
FIG. 4 is a graph illustrating the spectral transmittances of blue, red and infrared filters.
Figure 5:
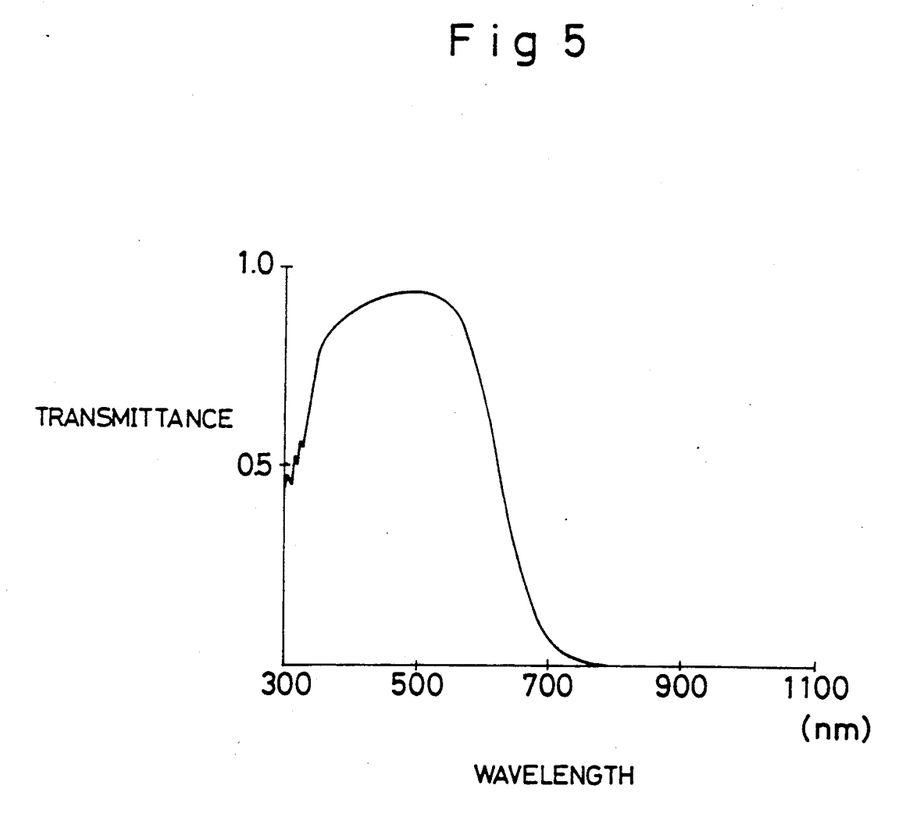
FIG. 5 is a graph illustrating a spectral transmittance of an infrared cut filter.

As illustrated in detail in FIG. 3, the light sensors 16, 17 and 18 include photo-diodes 16a, 17a and 18a having the same spectral sensitivity and blue, red and infrared transmitting filters 16b, 17b and 18b disposed in front of and close to the photo-diodes 16a, 17a and 18a, respectively. The respective transmitting filters 16b, 17b and 18b have different spectral transmittances B, R and iR, respectively, as illustrated in FIG. 4. The blue and red transmitting filters 16b and 17b do not absorb all of the infrared light as is apparent from FIG. 4. To isolate infrared light from the blue and red transmitting filters 16b and 17b, infrared cut filters 16c and 17c are provided, which have spectral transmittances as illustrated in FIG. 5, secured to front surfaces of the red transmitting filters 16b and 17b respectively. The respective light sensors 16, 17 and 18, respectively, receive corresponding color components of the light passed through the diffusion plate 14 from a subject field including a subject 12 and provide appropriate intensities signals proportional to the received quantities of light. Although the taking lens 11 usually varies between an angle of view of approximately 15 degrees and 60 degrees according to the focal lengths, it is preferred to design each light sensor 16, 17 and 18 and its associated elements so as to receive light at an acceptance angle of approximately 90 degrees in order to prevent a disproportion in the color components of the light received by the light sensors 16 and 17.

Behind the taking lens 11, a diaphragm 21 and a beam splitter 22 are disposed in the optical path 19 of the taking lens 11. The light passed through the taking lens 11, after passing through the diaphragm 21 when fully opened, is divided into two beams by the beam splitter 22. One of the two beams is reflected back and then forth by half mirrors 22a and 22b and directed to a photo-electric element 24 of an automatic exposure (AE) control unit 26 through a lens 23. The photo-electric element 24 provides an exposure control signal corresponding to the received quantity of light received thereby and sends the signal to the AE control unit 26 which determines an exposure, namely the aperture size of the diaphragm 21 and the speed of a shutter 27 in a well known manner.

The other beam travels straight and passes out the beam splitter 22. This beam next reaches a quick return mirror 29 disposed in the optical path 19 at a right angle. The quick return mirror 29, when positioned as illustrated in FIG. 2, reflects the beam upward at a right angle and directs the beam to a focusing screen or glass 31 to form an image of the subject 12 on the focusing glass 31. The image formed on the focusing glass 31 can be viewed through a finder which includes a pentagonal prism 32 and an eye piece lens 33. As is well known in the art, when a shutter release button 15 is depressed, the quick return mirror 29 quickly moves up and down. When the quick return mirror 29 moves up, as illustrated by a phantom line in FIG. 2, and the shutter 29 simultaneously opens, the beam impinges upon an image sensor unit 34 to form an image of the subject 12 on the surface of the image sensor unit 34.

The shutter 27 is disposed between the quick return mirror 29 and the image sensor unit 34. The shutter 27 opens and closes in response to a control signal provided from the AE control unit 26 upon the depression of the shutter button 15. The image sensor unit 34 includes an image sensor, such as a charge coupled device (CCD), attached with blue, green and red filters arranged in a mosaic pattern. The filters may be of any conventional type. The image sensor unit 34 provides three primary color image signals R, G and B in the form of a photo-electric signal and sends the signals to a signal processing circuit 36. In the signal processing circuit 36, the color image signals are subjected to amplification, demodulation and gamma correction. One of the processed color image signals, namely the green image signal G, is directly sent as a brightness signal Y to a video signal processing circuit 39. The other two color images signals, namely the blue and red image signals B and R, are also sent to the video signal processing circuit 39 but through amplifiers 37 and 38, respectively. The respective color image signals R and B and the brightness signal Y are subjected a matrix-operation and a color encoding process in the video signal processing circuit 39 so that the signals may be transformed into video signals meeting a standard color television system such as the NTSC system. The video signals thus provided and transformed are sent to a video recorder 41 and recorded as a still image on a still video floppy disk.

The blue and red sensors 16 and 17 of the sensor unit 13 provide appropriate photo-electric signals and send the signals to a color temperature detecting circuit 42 to transform the signals into color temperature signals. The color temperature detecting circuit 42 responds to a signal output from a light source determining circuit 44 in a fluorescent lighting mode where the subject 12 is illuminated with fluorescent light or in a normal lighting mode where the subject 12 is illuminated with natural light or light from a tungsten-filament lamp, such as sun light. If the color temperature detecting circuit 42 is actuated in the normal mode, a color temperature signal upon signal based upon comparison of the photo-electric signals from the blue and red sensors 16 and 17 is immediately outputted by the color temperature detecting circuit 42. Otherwise, if the color temperature detecting circuit 42 is actuated in the fluorescent lighting mode, the photo-electric signals of the photo-electric signals from the blue and red sensors 16 and 17 are integrated within the color temperature detecting circuit 42 for a certain period of time and a color temperature signal is outputted based on a comparison of the integrated results.

A white balance (WB) control circuit 43 receives the color temperature signal from the color temperature detecting circuit 42 to provide gain control amplifiers 37 and 38 with blue and red gain control signals, respectively. The gain control amplifiers, 37 and 38 change gains according to the received gain control signal from the WB control circuit 43 so that the amplification factor for the color image signal from the signal varies processing circuit 36. For example, if the color temperature is relatively low, the amplifier 37 changes the gain for the blue image signal in a relatively large amount and the amplifier 38 changes the gain for the red image signal in a relatively small amount, respectively. Therefore, the video signal processing circuit 39 receives image signals corrected according to the color temperature of the light illumination. Thereby, whereby the video recorder 41 can record image signals of an image having a normal or a standard color balance.

The photo-electric signals from the blue and red sensors 16 and 17 are also sent to a light source determining circuit 44 to determine or decide whether the subject 12 is illuminated with fluorescent light or natural light. Only when the photo-electric signal from the red sensor 17 is higher than a predetermined red signal level and the electric signal from the infrared sensor 18 is lower than a predetermined infrared signal level, the light source determining circuit 44 outputs an actuation signal to the color temperature detecting circuit 42. Otherwise, if the photo electric signal from the red sensor 17 is lower than the predetermined red signal level, the light source determining circuit 44 does not output any actuation signal.

Figure 6:
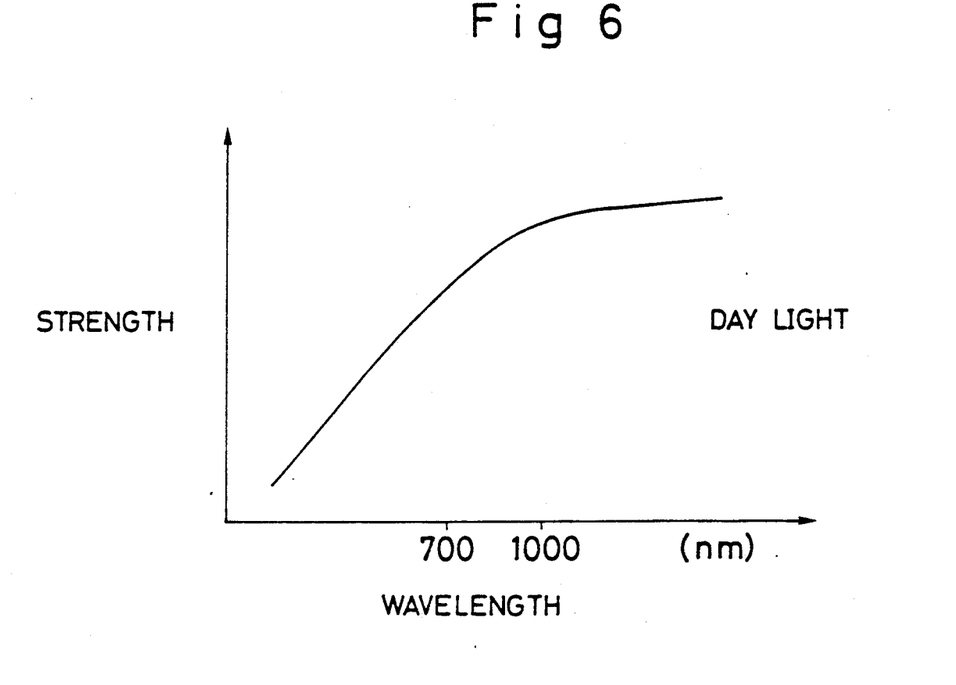
FIG. 6 is a graph illustrating an energy distribution of radiation from day light.

Upon powering the camera 10, the sensor unit 13 is actuated. Each sensor 16, 17 and 18 receives the light reflected from the subject 12 and the ambient light, which have passed through the diffusion plate 14. Photo-electric outputs from the sensors 16, 17 and 18 are sent to both the color temperature detecting circuit 42 and the light source determining circuit 44. Because day light (natural light) or light from a tungsten-filament lamp has a spectral distribution as illustrated in FIG. 6, outputs from the sensors 16, 17 and 18 are higher than the predetermined signal levels, respectively, in the normal lighting mode. The light source determining circuit 44 receives an output from the infrared sensor 18 that is higher than the predetermined signal level and, therefore, an actuation signal is not outputted to the color temperature detecting circuit 42. The color temperature detecting circuit 42 directly compares the photo-electric signals from the blue and red sensors 16 and 17 of the sensor unit 13 and determines the color temperature of the light from the subject 12. The WB control circuit 43 provides gain control signals and sends the signals to the gain control amplifiers 37 and 38, respectively.

When the shutter button 15 is operated, the AE control unit 26 provides an aperture size for the diaphragm 21 and a speed of the shutter in a combination which is equivalent to the output from the photo-electric element 24. Upon moving-up the quick return mirror 29, the diaphragm 21 is opened to the aperture size operated by the AE control unit 26 and the shutter 27 is opened and closed at the speed operated by the AE control unit 26, immediately after the opening of the diaphragm 21. As a result, the image sensor unit 34, on which an image of the subject 12 is formed, outputs three primary color image signals. The red and blue image signals R and B are transmitted to the video signal processing circuit 39 through the amplifiers 37 and 38. However, the infrared signal iR is transmitted directly as a brightness signal Y to the the video signal processing circuit 39.

Because the gain of the amplifiers 37 and 38 have been adjusted according to the color temperature of the light by which the subject 12 is illuminated, the video signal processing circuit 39 receives standardized color image signals and provides video signals that are well corrected in color balance. The color balance corrected video signals are written on the still video floppy disk.

Figure 7:
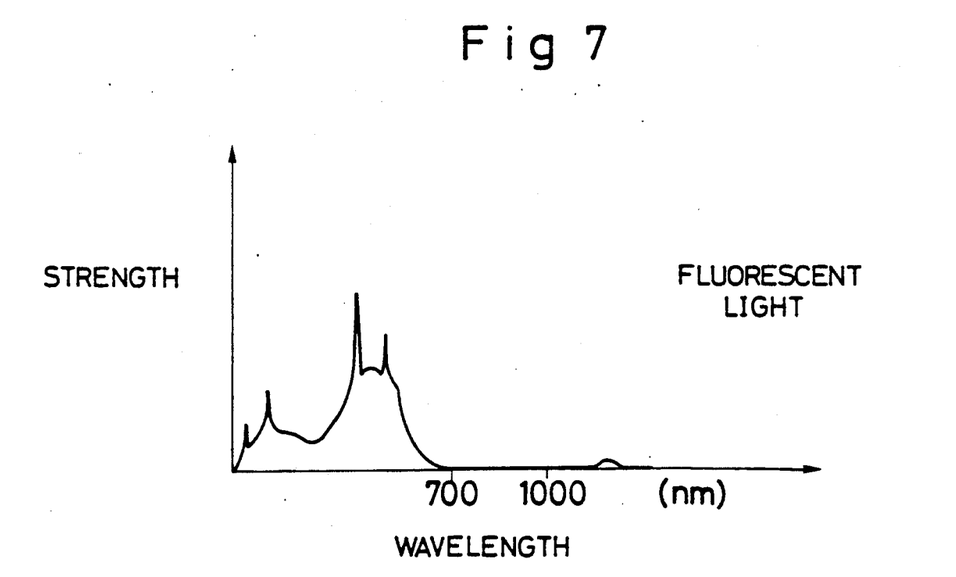
FIG. 7 is a graph illustrating an energy distribution of radiation from a fluorescent lamp.

Fluorescent light from a fluorescent lamp has a spectral distribution as illustrated in FIG. 7. Whereas the fluorescent lamp emanates energy radiation in a wavelength range of visible light wavelength, energy radiation nevertheless, is not produced at a wavelength longer than 620 nm. Therefore, in the fluorescent lighting mode, the blue and red sensors 16 and 17 output signals that have detectable levels, respectively, but the infrared sensor 18 outputs no detectable level of signal. When the light source determining circuit 44 receives no output from the infrared sensor 18 while an output from the red sensor 17 higher than a predetermined level it provides an actuation signal to the color temperature detecting circuit 42. Under the presence of the actuation signal, the color temperature detecting circuit 42 operates in the fluorescent light operation mode to detect a color temperature of the light which now illuminates the subject 12. The WB control circuit 43 outputs gain control signals to the amplifiers 37 and 38, respectively, to adjust the color image signals. Thereby, the color image signals corresponding to the fluorescent light tinted strong blue are changed to image signals corresponding to light having a standard color temperature, such as day light. Accordingly, the video signal processing circuit 39 receives standardized color image signals and provides video signals well corrected in color balance. The color balance corrected video signals are written on the still video floppy disk. If desirable, the actuation signal from the light source determining circuit 44 can also be transmitted to the AE control unit 26 so that the shutter 27 is actuated at a slow speed suitable for the fluorescent light photographic mode, such as a speed slower than 1/50 sec.

If the light source determining circuit 44 does not receive signal a higher than the predetermined level from the red sensor 17, which indicates that the amount of light illuminating the subject 12 is too small, an actuation signal is not outputted. In such a case, it is preferred to develop a warning for indicating that an under exposure will be possibly effected.

In the above described embodiment, the infrared sensor 18 can be provided separately from the remaining sensors 16 and 17 for detecting visible light. Furthermore, the visible light sensors and/or the infrared sensor can be disposed at a position where light passes the taking lens 11, such as the position of the photo-electric element 24 of the AE control unit 26.

Figure 8:
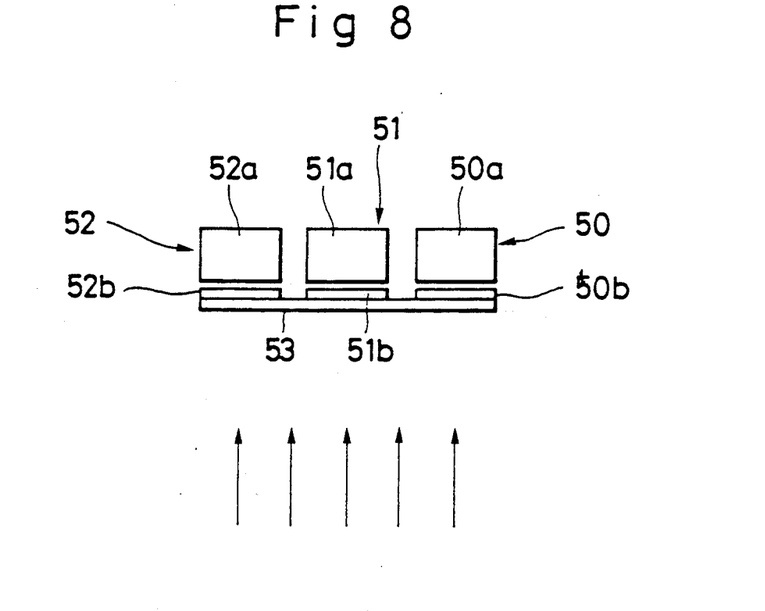
FIG. 8 illustrates a variant of the sensor unit used in the block diagram of FIG. 1.
Figure 9:
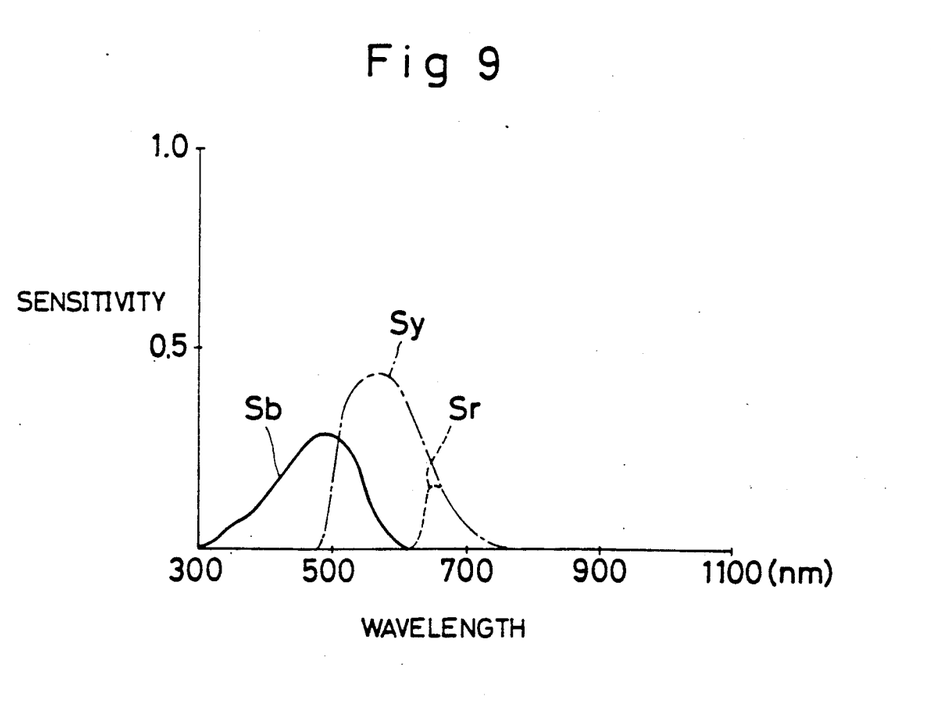
FIG. 9 is a graph illustrating the spectral transmittances of of the sensor unit in FIG. 8.

To determine whether a fluorescent light source illuminates the subject 12, it is possible to compare light components having wavelengths close to, and longer than and shorter than 620 nm. Referring to FIG. 8, a variant of the sensor unit 13 is illustrated which includes blue, yellow and red sensors 50, 51 and 52. The blue sensor 50 includes of a photo-electric element 50a having a blue transmitting filter 50b attached to the surface thereof. Similarly, the yellow sensor 51 includes of a photo-electric element 51a having a blue transmitting filter 51b attached to the surface thereof. The red sensor 52 includes of a photo-electric element 52a having a filter 52b attached thereto that transmits light having wavelengths longer than 620 nm. These transmitting filters 51b, 51b and 52b are attached to an integral infrared light that shuts off light having wavelengths longer than 700 nm. Therefore, the red sensor 62 receives light having wavelengths between 620 and 700 nm. The blue, yellow and red sensors 50, 51 and 52 have spectral sensitivities $S_b$, $S_y$ and $S_r$, respectively, as illustrated in FIG. 9. In a similar manner, the color temperature of the reflected light from the subject is determined in response to the outputs from the blue and yellow sensors 50 and 51. Thereby, the determination of the light source emanating light illumination for the subject 12 is effected in response to the outputs from the yellow and red sensors 51 and 52.

Although the present invention has been fully described by way of the preferred embodiments thereof with reference to the accompanying drawings, it is to be noted that various changes and modifications may be apparent to those skilled in the art. Therefore, unless these changes and modifications depart from the scope of the present invention, they should be construed as included therein.

What is claimed is:

1. An electronic image forming device having a color image sensor which includes a white balance control device, said white balance control device comprising:

a visible light sensor for detecting a range of visible light from a scene illuminated by a light source;

an infrared light sensor for detecting said light from said scene illuminated by said light source having wavelengths longer than 620 nm;

color balance correcting means, capable of being operated in a fluorescent light mode and a natural light mode, for detecting a color temperature of said light in response to an output from said visible light sensor and developing a correction signal corresponding to said color temperature which corrects the white balance of image signals from said color image sensor; and light source determining means for determining whether said light source comprises a fluorescent light source or natural light by comparing a predetermined infrared signal level with an output from said infrared light sensor and a predetermined visible light signal with an output from said visible light sensor for developing an actuating signal which operates said color temperature detecting means in said fluorescent light mode when said light source is determined to comprise said fluorescent light source by said output from said visible light sensor being higher than said predetermined visible light signal and said output from said infrared light sensor being lower than said predetermined infrared signal level as a result of the comparison.

2. A white balance control device as defined in claim 1 wherein said output from said visible light sensor comprises red light.

3. A device as defined in claim 1, wherein said visible light sensor outputs said visible light in a plurality of wavelengths, and said color balance correcting means determines said color temperature of said light in response to the outputs for said plurality of wavelengths of said visible light from said visible light sensor for providing said correction signal corresponding to said color temperature.

4. A device as defined in claim 3, wherein said plurality of wavelengths of said light comprise red and blue light.

5. A device as defined in any one of claims 1, 2, 3 and 4, wherein each of said visible and infrared light sensors comprises a photoelectric element for developing an output proportional to the amount of said light illuminated thereon and a corresponding color transmitting filter attached to said photo-electric element.

6. An electronic image forming device having a color image sensor which includes a white balance control device, said white balance control device comprising:

a blue light sensor for detecting blue light from a scene illuminated by a light source;

a red light sensor for detecting red light from said scene illuminated by said light source;

an infrared light sensor for detecting said light from said scene illuminated by said light source having wavelengths longer than 620 nm;

color balance correcting means, capable of being operated in a fluorescent light mode and a natural light mode, for detecting a color temperature of said light in response to outputs from said blue and red light sensors and developing a correction signal corresponding to said color temperature which corrects the white balance of image signals from said color image sensor; and light source determining means for determining whether said light source comprises a fluorescent light source or natural light in response to comparing the outputs from said infrared and red light sensors so that when said infrared sensor fails to output a signal and the output from said red light sensor is higher than a predetermined level, an actuation signal for a fluorescent mode is developed.

7. A device as defined in claim 6, wherein each of said blue, red and infrared light sensors comprises a photoelectric element for developing an output proportional to the amount of said light illuminated thereon and a corresponding color transmitting filter attached to said photo-electric element.

8. An electronic image forming device having a color image sensor which includes a white balance control device, said white balance control device comprising:

a blue light sensor for detecting blue light from a scene illuminated by a light source;

a yellow light sensor for detecting yellow light from said scene illuminated by said light source;

a red light sensor for detecting red light from said scene illuminated by said light source having wavelengths between 620 and 700 nm;

color balance correcting means, capable of being operated in a fluorescent light mode and a natural light mode, for detecting a color temperature of said light in response to the outputs from said blue and yellow light sensors and developing a correction signal corresponding to said color temperature which corrects the white balance of image signals from said color image sensor; and light source determining means for determining whether said light source comprises a fluorescent light source or natural light in response to comparing the outputs from said yellow and red light sensors so that when said yellow light sensor fails to output a signal and the output from said red light sensor is higher than a predetermined level, an actuation signal for a fluorescent mode is developed.

9. A device as defined in claim 8, wherein each of said blue, yellow and red light sensors comprises a photoelectric element for developing an output proportional to the amount of said light illuminated thereon and a corresponding color transmitting filter attached to said photo-electric element, each of said blue, yellow and red light sensors having an infrared cut filter attached thereto.

10. A light source determining device comprising:

a visible light sensor detecting a range of visible light from a scene illuminated by a light source;

an infrared light sensor for detecting said light from said scene illuminated by said light source having wavelengths longer than 620 nm; and determining means for comparing outputs from said visible light sensor and said infrared light sensor and determining that said light source comprises a fluorescent light source or natural light when the output from said infrared light sensor is lower than a predetermined infrared signal level and the output from said visible light sensor is higher than a predetermined visible signal level.

11. A white balance control device as defined in claim 10, wherein said visible light sensor detects red light.

12. An electronic image forming device having a color image sensor which includes a white balance control device, said white balance control device comprising:

a yellow light sensor for detecting yellow light from said scene illuminated by said light source;

a red light sensor for detecting said light from said scene illuminated by said light source having wavelengths longer than 620 nm, each of said yellow and red light sensors having an infrared cut filter attached thereto; and determining means for determining whether said light source comprises a fluorescent light source or natural light in response to comparing the outputs from said yellow and red light sensors to that when said yellow light sensor fails to output a signal and the output from said red light sensor is higher than a predetermined level, an actuation signal for a fluorescent mode is developed.

13. A method for determining whether a fluorescent light source illuminates a scene in an electronic image forming device having a color image sensor which includes a white balance control device comprising the steps of:

(a) detecting a range of visible light from the scene illuminated by a light source;

(b) outputting a visible light signal corresponding to said light detecting at said step (a);

(c) detecting said light from the scene illuminated by said light source having wavelengths longer than 620 nm;

(d) outputting an infrared light signal corresponding to said light detected at said step (c);

(e) detecting a color temperature of said light in response to said visible light signal by a fluorescent light mode or a natural light mode;

(f) developing a correction signal corresponding to said color temperature for correcting the white balance of image signals from said color image sensor;

(g) determining whether said light source comprises a fluorescent light in response to said infrared light signal by comparing said visible light signal to a predetermined visible light signal level and said infrared light signal to a predetermined infrared light signal level; and (h) developing an actuating signal for operating said step (e) by said fluorescent mode when said light source comprises a fluorescent light source in response to the determination at said step (g) when said visible light signal is higher than said predetermined visible light signal level and said infrared light signal is lower than said predetermined infrared light signal level.

* * * * *